United States Patent

Tabarovsky et al.

[11] Patent Number: 6,060,886
[45] Date of Patent: May 9, 2000

[54] RADIAL SOUNDING ELECTRICAL WELL LOGGING INSTRUMENT

[75] Inventors: Leonty A. Tabarovsky; Antonio Fabris; Alberto G. Mezzatesta; Gregory B. Itskovich, all of Houston, Tex.

[73] Assignee: Western Atlas International, Inc., Houston, Tex.

[21] Appl. No.: 09/007,159

[22] Filed: Jan. 14, 1998

[51] Int. Cl.$^7$ ........................................................ G01V 3/18
[52] U.S. Cl. ............................................. 324/373; 324/366
[58] Field of Search ................................... 324/366, 373, 324/374, 375

[56] References Cited

U.S. PATENT DOCUMENTS

4,646,026  2/1987  Chemali et al. ........................ 324/375

Primary Examiner—Walter E. Snow
Attorney, Agent, or Firm—Richard A. Fagin; Madan, Mossman & Srirman

[57] ABSTRACT

An apparatus for determining radial distribution of resistivity of earth formations surrounding a wellbore. The apparatus includes a sonde mandrel having an insulating exterior surface and electrodes disposed on the insulating surface at spaced apart locations. The electrodes are connected to circuits for measuring a focused current resistivity within a predetermined longitudinal span. The electrodes are also connected to circuits for measuring electrical impedance between pairs of electrodes spaced apart at a plurality of different longitudinal spacings. The preferred embodiment includes a voltage measuring circuit interconnected between a pair of electrodes which is positioned between a closest spaced pair of electrodes connected to the impedance measuring circuits, so that a vertical resolution of the impedance measurements can be limited to approximately the axial spacing of the pair of electrodes connected to the voltage measuring circuit. A method according to the invention for determining the distribution of resistivity of earth formations surrounding a wellbore includes the steps of measuring a focused current resistivity of the earth formations to determine a composite resistivity of an uninvaded zone, an invaded zone and a flushed zone. Impedance is measured between pairs of electrodes, each pair having a different longitudinal spacing, and resistivity of the flushed zone and the invaded zone are determined from the measurements of impedance. The resistivity of the uninvaded zone can then be determined from the measurement of focused current resistivity.

6 Claims, 5 Drawing Sheets

Fig. 1

EQUIVALENT CIRCUIT DEEP
LATEROLOG CONFIGURATION

EQUIVALENT CIRCUIT RADIAL SOUNDING CONFIGURATION

RADIAL SOUNDING ELECTRICAL WELL LOGGING INSTRUMENT

BACKGROUND OF THE INVENTION

1. Field of the Invention

The invention is related to the field of electric wireline well logging instruments for making measurements of the electrical resistivity of earth formations. More specifically, the invention is related to so-called "galvanic" electrical resistivity measuring instruments, which pass electrical current through various electrodes on the instrument and measure voltage differences between the electrodes to determine the formation resistivity.

2. Description of the Related Art

Electric wireline well logging instruments known in the art include galvanic resistivity instruments. Galvanic resistivity instruments make measurements related to the electrical resistivity of earth formations surrounding the wellbore in which the instrument is disposed. Typically galvanic resistivity instruments include a number of spaced apart electrodes disposed on an insulating part of the instrument. Some of the electrodes are used to emit electrical current into the wellbore, and then into the surrounding earth formations. Other ones of the electrodes are used to make measurements of voltage drop. Measurements of the voltage drop and of the magnitude of the electrical current which results in that voltage drop are used to determine the electrical resistivity of the earth formation.

Certain types of galvanic resistivity instruments are known as "unfocused" devices which include so-called "normal" and "lateral" measurements. See for example, E. L. Bigelow, "Introduction to Wireline Log Analysis", Western Atlas Logging Services, Houston, Tex. (1992) p. 57. Unfocused galvanic resistivity instruments typically inject current at one electrode and return it at another, making one or more different measurements of voltage drop and current magnitude at the same or other electrodes. The spacing between the electrodes used to inject the electrical current into the earth formations, and the spacing of the electrodes used to measure the voltage drop are related both to the vertical resolution of the resulting resistivity determinations and to the radial "depth of investigation" of the resistivity determinations. The latter term, depth of investigation, describes the radial distance from the central axis of the instrument where the formations for which the measurements are made are located. In general, as the electrode spacing increases, the vertical resolution of the measurements becomes more coarse (larger) while the radial depth of investigation becomes greater.

It is desirable to determine resistivity at a variety of radial depths within the earth formation particularly to determine whether and to what extent any fluid from the wellbore has displaced connate fluid in the pore spaces of the earth formation, and to determine the resistivity of the connate fluid in the earth formation where it has not been displaced. For this purpose some galvanic resistivity instruments include an array of injection and voltage drop measuring electrodes for determining the resistivity of the earth formations at a plurality of different radial depths of investigation within the earth formation. See for example, U.S. Pat. No. 2,920,266 issued to Owen and U.S. Pat. No. 3,697,864 issued to Runge.

Array galvanic resistivity devices such as shown in the Runge '864 patent and the Owen '266 patent have several limitations. First, the radial depth of investigation is limited, even at relatively long electrode spacings, particularly when the resistivity of the earth formations is substantially higher than the resistivity of the fluid in the wellbore. In such cases much more of the electrical current will flow within the wellbore fluid than will flow in the earth formations surrounding the wellbore. Second, some earth formations can be relatively deeply penetrated ("invaded") by the fluid from the wellbore. Measuring resistivity of the uninvaded formation using an array galvanic instrument would require such long electrode spacings as to make the instrument impracticably long. Further, the vertical resolution of the instrument at such long electrode spacings would be so coarse as to be unable to determine the formation resistivity within relatively thin earth formation layers.

A type of galvanic resistivity instrument known in the art as the "dual laterolog" instrument, can measure formation resistivity within relatively thin "layers" at relatively great radial depth of investigation even when the formation resistivity is much higher than the resistivity of the fluid in the wellbore. The principle of this instrument is described in the "Introduction to Wireline Log Analysis" reference on pages 58–59. The dual laterolog instrument includes a measuring current circuit and a focusing current circuit. The measuring current circuit passes electrical current from a source electrode through a the wellbore and the earth formations to a return electrode generally located at the earth's surface. The magnitude of the measuring current and its voltage drop are measured. The current magnitude and voltage drop are related to the resistivity of the earth formation. The layer within the earth formations for which the resistivity is measured is constrained by the focusing current. The focusing current is emitted by "guard" or "bucking" electrodes spaced symmetrically about the source electrode. The magnitude of the focusing current is continuously adjusted so that substantially no voltage drop occurs in a direction parallel to the axis of the instrument. The measuring current is therefore constrained to flow substantially radially outwardly from the instrument into the earth formations. The vertical resolution of the dual laterolog instrument is generally related to the axial spacing between the guard electrodes nearest to the measuring current source electrode.

The voltage drop of the measuring current, however, is related to the resistivity of every component along the path of the measuring current from the source electrode to the return electrode. These components include the fluid in the wellbore and the earth formations in which part or all of the connate fluids have been displaced. The measurements made by the dual laterolog instrument are therefore affected by the resistivity of the fluid in the wellbore, and the resulting resistivity of the earth formations in which the connate fluid has been partially or totally displaced by fluid from the wellbore. The dual laterolog instrument seeks to overcome this limitation by providing a second ("shallow") laterolog measurement which is intended to have a shallower radial depth of investigation. The shallow laterolog measurement is typically made by returning the focusing current to electrodes on the sonde mandrel rather than to the armor on the electrical cable used to convey the instrument, or to the earth's surface. This allows the measuring current to disperse at a relatively shallow radial depth within the earth formations.

The combination of "deep" and shallow laterolog measurements from the dual laterolog instrument has proven inadequate to resolve the radial distribution of resistivity in the earth formations proximal to the wellbore, because this resistivity distribution can vary to such as great degree depending on factors such as the hydraulic properties of the fluid in the wellbore, and the porosity and permeability of the earth formations. Both the deep and shallow laterolog measurements are affected by the distribution resistivity proximal to the wellbore. Further, in the case where the fluid in the wellbore is not very conductive as compared to the earth formations surrounding the wellbore, both the deep laterolog and the shallow laterolog measurements are subject to substantial error as a result of the relatively large amount of the total voltage drop which will occur in the formations proximal to the wellbore.

What is needed is a resistivity measuring instrument that can resolve the radial distribution of resistivity of earth formations while also providing relatively resistivity measurements having fine vertical resolution and great radial depth of investigation.

SUMMARY OF THE INVENTION

The invention is an apparatus for determining the radial distribution of electrical resistivity of earth formations surrounding a wellbore. The apparatus includes a sonde mandrel having an insulating exterior surface. Electrodes are disposed on the insulating surface at spaced apart locations. The electrodes are connected to circuits for measuring a focused current resistivity within a predetermined axial span. The electrodes are also connected to circuits for measuring electrical impedance between pairs of the electrodes spaced apart at a plurality of different axial spans. The preferred embodiment of the invention also includes a voltage measuring circuit interconnected between a pair of the electrodes which is positioned between the closest spaced one of the pairs of electrodes connected to the impedance measuring circuits, so that an axial span of the impedance measurements can be limited to the axial spacing of the pair of electrodes connected to the voltage measuring circuit.

A method according to the invention for determining the distribution of resistivity of earth formations surrounding a wellbore includes the steps of measuring a focused current resistivity of the earth formations to determine a composite resistivity of an uninvaded zone, an invaded zone and a flushed zone. Impedance is measured between pairs of electrodes, each pair having a different longitudinal spacing, and resistivity of the flushed zone and the invaded zone are determined from the measurements of impedance. The resistivity of the uninvaded zone can then be determined from the measurement of focused current resistivity.

DESCRIPTION OF THE PREFERRED EMBODIMENT

Figure 1:
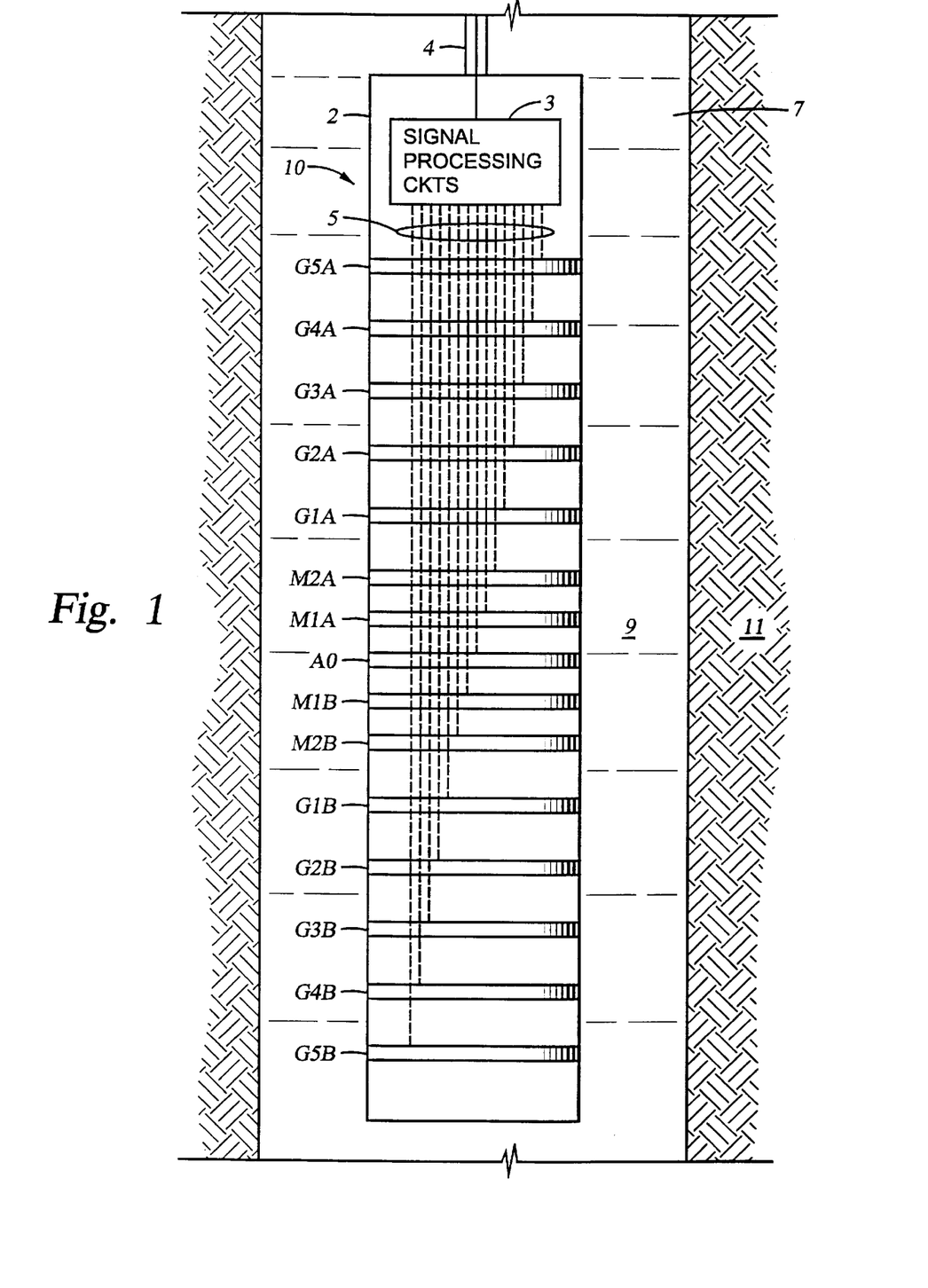
FIG. 1 shows the sonde mandrel of a resistivity measuring instrument according to the invention.

An electric wireline formation resistivity measuring instrument is shown generally in FIG. 1. The instrument 10 includes a sonde mandrel 2 which has an insulating exterior surface, such as can be made from glass fiber reinforced plastic or similar material. Electrodes, shown at G5A, G4A, G3A, G2A, G1A, M2A, M1A, A0, M1B, M2B, G1B, G2B, G3B, G4B, G5B are disposed on the insulating exterior of the sonde mandrel 2 at spaced apart locations. The electrodes G5A, G4A, G3A, G2A, G1A, M2A, M1A, A0, M1B, M2B, G1B, G2B, G3B, G4B, G5B are individually electrically connected through wires such as shown generally at 5 to signal processing circuits, shown generally at 3. The functions incorporated in the signal processing circuits 3 will be further explained.

The electrodes G5A, G4A, G3A, G2A, G1A, M2A, M1A, M1B, M2B, G1B, G2B, G3B, G4B and G5B can be arranged substantially axially symmetrically about a center electrode A0 in opposed pairs such as a pair consisting of M1A and M1B, each of which has substantially the same distance along the mandrel 2 from the center electrode A0. Similar symmetric arrangements can be provided for each electrode in opposed pair M2A and M2B, and so on through opposed electrode pair G5A and G5B. The purposes for the arrangement of the electrodes G5A, G4A, G3A, G2A, G1A, M2A, M1A, A0, M1B, M2B, G1B, G2B, G3B, G4B, G5B on the sonde mandrel 2 will be further explained.

During operation, the instrument 10 is extended into and withdrawn from a wellbore 7 drilled through earth formations 11, typically by means of a winch-driven armored electrical cable 4 or similar conveyance known in the art. The armored electrical cable 4 includes one or more electrical conductors (not shown in FIG. 1) for carrying electrical power to the instrument 10 and for transmitting measurement signals made by the instrument 10 to the earth's surface for decoding and interpretation.

The wellbore 7 is typically filled with an electrically conductive fluid called "drilling mud" 9. Electrical currents are applied to some of the electrodes and flow into the wellbore fluid 9 and then into the earth formations 11. Other ones of the electrodes are used to measure voltage drop of the electrical currents as they flow in the wellbore fluid 9 and the formations 11. Still other electrodes are used to return some of the current injected by some of the electrodes, as will be further explained. Measurements of electrical the current magnitude and of the voltage drop for each particular current are combined, as will be further explained, to determine the electrical resistivity of the earth formations 11 at various radial depths within the earth formations 11.

Figure 2:
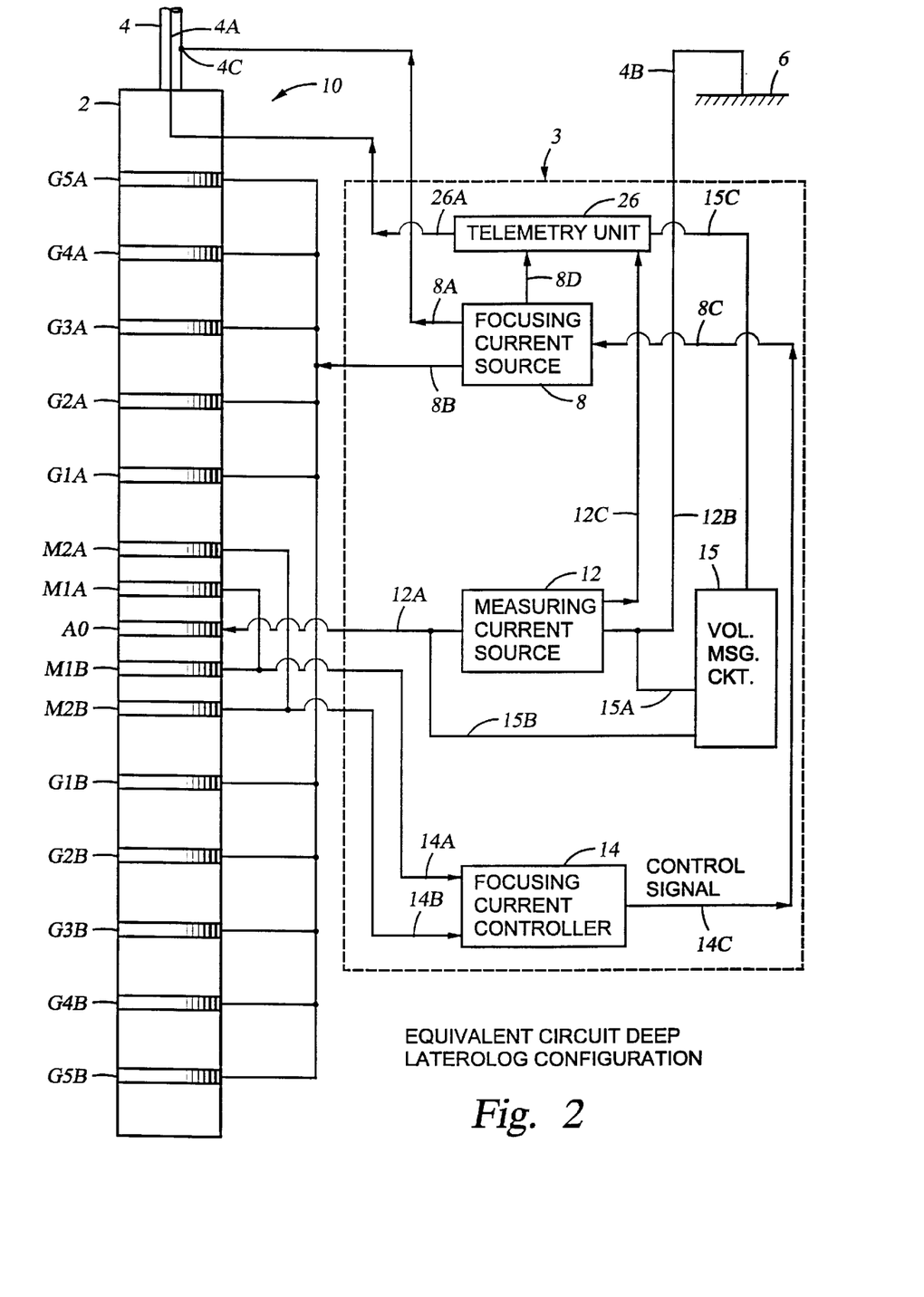
FIG. 2 shows equivalent electrical circuitry for the instrument in a focused resistivity, or so-called "deep laterolog", electrical configuration.

Referring now to FIG. 2, the functions incorporated in the signal processing circuits 3, and one purpose for the arrangement of the electrodes, will be explained in more detail. The instrument 10 is shown in FIG. 2 in a focused current, or so-called "deep laterolog", configuration. The focused current configuration is used to determine the resistivity of the earth formations (11 in FIG. 1) at a relatively deep radial depth within the formations 11, where relatively little of the connate fluids in the formations have been displaced by the liquid phase of the drilling mud (9 in FIG. 1) in the wellbore (7 in FIG. 1). The principle of the focused current configuration is known in the art and is described for example in, "Introduction to Wireline Log Analysis", E. L. Bigelow, Western Atlas Logging Services, Houston, Tex. (1992) pp. 58–59. The configuration shown in FIG. 2 is electrically equivalent to the "deep laterolog" instrument described in the Bigelow reference. FIG. 2 shows a functional block diagram of circuit elements forming part of the signal processing circuits 3 which are used in the focused current configuration. The positions of certain "blocks" in the diagram representing particular circuit elements as shown in FIG. 2 are for illustrative purposes only and are not meant to represent the physical location of the actual circuit element which performs the function described for the particular "block".

In the focused current configuration, the center electrode A0 can be connected to one output terminal 12A of a measuring current source 12. The other output terminal 12B of the measuring current source 12 can be connected to a return electrode 6 disposed at the earth's surface through an insulated electrical conductor 4B in the cable 4. The measuring current source 12 can form part of the signal processing circuitry 3. The measuring current source 12 preferably generates some form of alternating current to avoid polarizing any of the electrodes, which would make measuring small voltages difficult, as is known in the art. A circuit which can perform the required function of the measuring current source 12 is described, for example, in U.S. Pat. No. 5,585,727 issued to Fanini et al and assigned to the assignee of this invention. Since the focused current configuration is intended to measure resistivity at a significant radial depth within the earth formations (11 in FIG. 1) from the instrument 10, the measuring current source 12 preferably generates relatively low frequency alternating current, such as in the range from about 1 to about 50 Hz, to reduce skin effect.

The path through the drilling mud (9 in FIG. 1) and the earth formations (11 in FIG. 1) taken by the measuring current as it is emitted from the center electrode A0 and is returned to the surface electrode 6 can be constrained to a relatively thin "layer" within the earth formations by using a "focusing" current. The focusing current can be generated by a focusing current source 8 connected at one output terminal 8A to electrodes G1A through G5A, and symmetrically to electrodes G1B through G5B. The focusing current source 8 can also be of a type such as the one described in the Fanini et al '727 patent, or any other suitable type of controllable-output AC signal generator. The focusing current source 8 should operate at the same frequency as the measuring current source 12. The other output terminal 8B of the focusing current source 8 can be connected to the armor 4C on the cable 4 to make a complete circuit for the focusing current. The focusing current constrains the path of the measuring current to flow substantially radially outward from the center electrode A0 and into the earth formations (11 in FIG. 1).

The magnitude of the focusing current is continuously adjusted to maintain the preferred flow path of the measuring current, by means of a focusing current controller 14. The focusing current controller 14 includes a voltage measuring circuit (not shown separately) whose input terminals 14A, 14B are connected between pairs of "monitor" electrodes M1A, M2A, and symmetrically to monitor electrodes M1B, M2B. The voltage measuring circuit (not shown) can be similar to one described in the Fanini et al '727 patent. The output of the voltage measuring circuit (not shown) causes controller 14 to place a signal on its control terminal 14C which is conducted to a control input terminal 8C on the focusing current source 8. This signal regulates the amount of current generated by the focusing current source 8, as is explained in the Fanini et al '727 patent. The amount of focusing current is preferably adjusted to maintain substantially zero voltage drop across monitor electrodes M1A, M2A and symmetrically M1B, M2B.

The focusing current source 8 is shown in FIG. 2 as a single device connected directly to all the guard electrodes G1A–G5A and G1B–G5B for clarity of the description of the invention. When the instrument 10 is to be operated in another electrical configuration called the "radial sounding configuration", which will be further explained, the guard electrodes G1A–G5A and G1B–G5B should be electrically isolated from each other. To accomplish the required electrical isolation, it may be convenient for the system designer to provide a separate focusing current source (not shown in FIG. 2) for each one of the guard electrodes G1A–G5A and G1B–G5B and maintain each such focusing current source at the same electrical potential to provide the electrical equivalent of the configuration shown in FIG. 2. A similar result can also be obtained by using a single focusing current source (as shown at 8 in FIG. 2) and electrically isolating the guard electrodes G1A–G5A and G1B–G5B from each other by including narrow band analog filters (not shown) connected between each guard electrode and the focusing current source 8, which would substantially prevent passage of electrical current at any frequency different from the frequency of the focusing current source 8. Still another alternative which could provide a similar electrical isolation would be to include a single focusing source (as shown at 8 in FIG. 2) connected to the electrodes by relays or switches (not shown) to enable disconnection of the guard electrodes G1A–G5A and G1B–G5B from the focusing source 8 and from each other when the instrument 10 is used in the "radial sounding" electrical configuration. These descriptions of electrical isolation of the guard electrodes G1A–G5A and G1B–G5B from each other are meant to serve only as examples and are not meant to limit the invention.

Signals which represent the measuring current magnitude output from terminal 12C of measuring current source 12, and a signal representing the focusing current magnitude output from terminal 8C of the focusing current source 8 can be conducted to a telemetry unit 26 for transmission of these signals to the earth's surface over a second insulated electrical conductor 4A in the cable 4 (or the first conductor 4B if convenient for the system designer). In addition, a voltage measuring circuit 15 can be connected across the measuring current source 12 for measuring the amount of voltage drop in the measuring current between the center electrode A0 and the surface electrode 6. The signal output 15C from the voltage measuring circuit 15 can also be conducted to the telemetry unit 26. The voltage measuring circuit 15 can also be included in the signal processing circuits 3. Such voltage measuring circuits and the controller (not shown) for adjusting the output of the focusing current source 14 are described in the Fanini et al '727 patent. The measurements of voltage drop and current magnitude in the measuring current are combined to determine the resistivity of the earth formations (11 in FIG. 1). Methods for combining the measurements to determine resistivity of the formation are known in the art.

Figure 4:
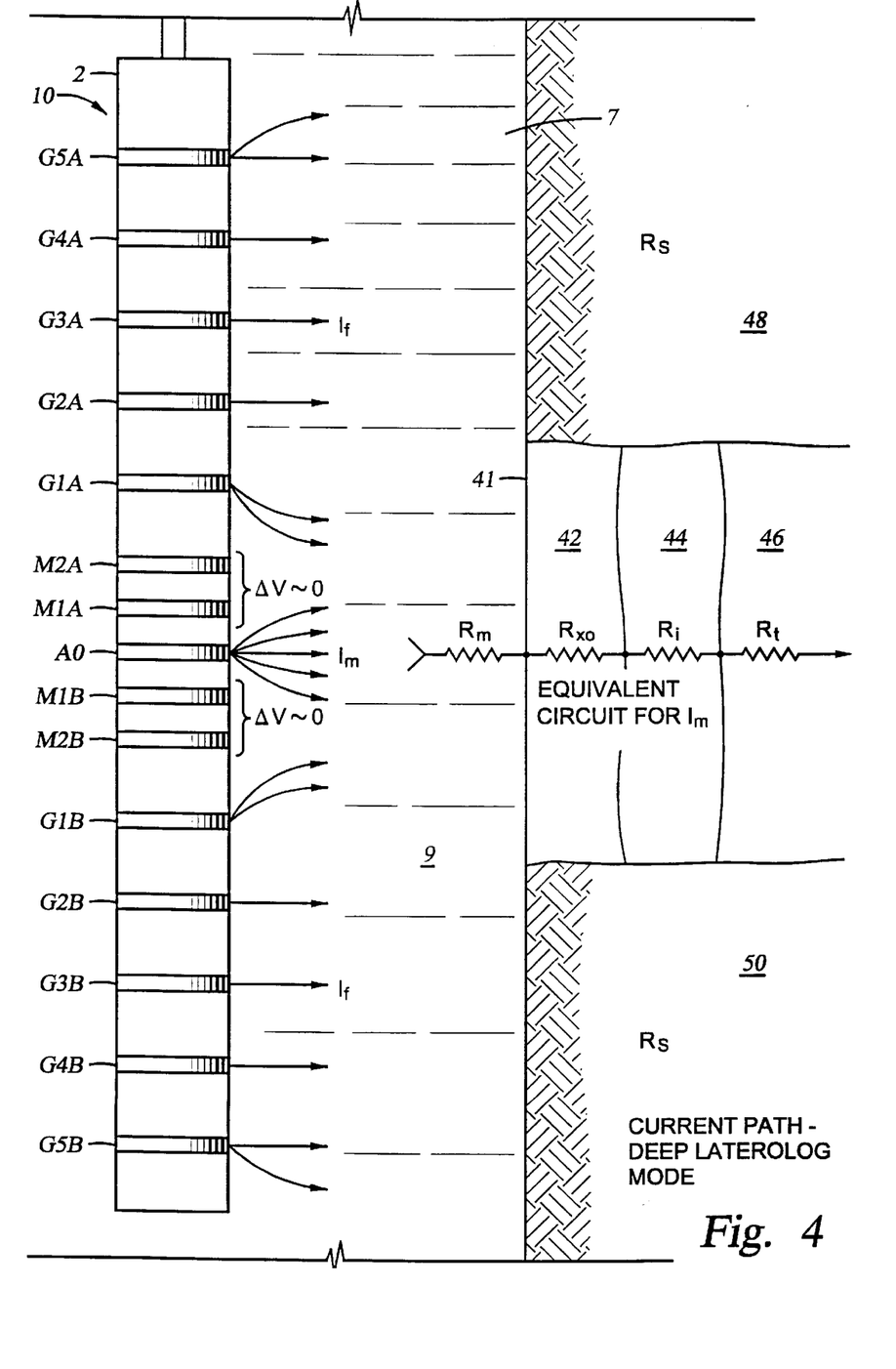
FIG. 4 shows electrical current flow from the instrument in the deep laterolog mode.

The current paths of the measuring and focusing currents are shown generally in FIG. 4. The measuring current is represented by $I_m$ and flows generally radially outwardly from center electrode A0. Focusing current, represented by $I_f$, is shown flowing radially outwardly from guard electrodes G1A–G5A, and symmetrically from electrodes G1B–G5B. The magnitude of the focusing current $I_f$ is adjusted to maintain substantially zero voltage drop across monitor electrodes M1A and M2A, and symmetrically M1B and M2B. As is known in the art, the measurements made by the instrument 10 in the focused current configuration are affected by the resistivity of the fluid 9, represented by $R_m$, as well as the resistivity of the earth formations 11 radially proximal to the wellbore 7 in a layer 41 which is permeable to fluid flow. These are shown as a "flushed" zone 42 having resistivity designated as $R_{xo}$, in which substantially all the connate fluid in the pore spaces of the layer 41 have been displaced by the wellbore fluid 9. The layer 41 also includes an "invaded" zone 44 having resistivity designated by $R_i$. In the invaded zone 44 some, but not all of the connate fluid has been displaced by the wellbore fluid 9. The layer 41 also includes an uninvaded zone 46 in which substantially none of the connate fluid has been displaced. The resistivity in the uninvaded zone is designated as $R_t$. The measurements made in the deep laterolog configuration will depend on the magnitudes of and the radial distribution of $R_m$, $R_{xo}$, $R_i$, as well as on the magnitude of $R_t$. The radial distribution of $R_m$, $R_{xo}$, $R_i$, and their magnitudes can be determined by measurements made by the instrument 10 in the "radial sounding" configuration.

Figure 3:
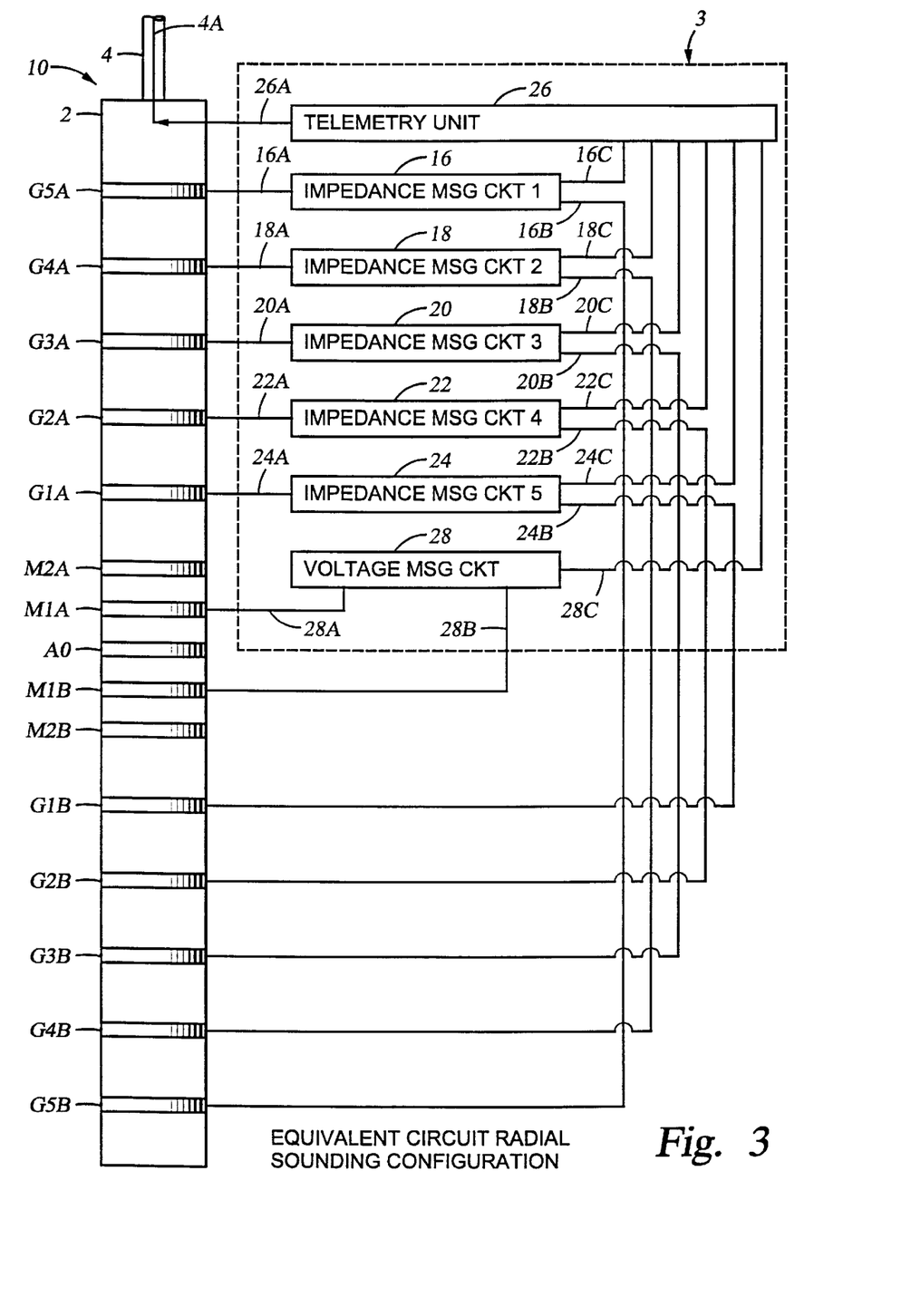
FIG. 3 shows equivalent electrical circuitry for the instrument in its "radial sounding" electrical configuration.

FIG. 3 shows equivalent electrical circuits in the signal processing circuits 3 when the instrument 10 is in the radial sounding configuration. As previously explained, opposed pairs of electrodes, such as G1A–G1B and so on through G5A–G5B are positioned symmetrically about the center electrode A0 along the sonde mandrel 2. Each opposed pair of these electrodes can be interconnected between an impedance measuring circuit in the radial sounding configuration. For example, electrodes G5A and G5B can be connected between measuring terminals 16A and 16B of a first impedance measuring circuit 16. The first impedance measuring circuit 16 can include a source of alternating current similar to those disclosed in the Fanini et al '727 patent, as well as a voltage measuring circuit similar to those disclosed in the Fanini et al '727 patent. The measurement output of the first impedance measuring circuit 16 can be conducted from output terminal 16C to the telemetry unit 26 for transmission to the earth;s surface for decoding and interpretation. Alternating current generated by the impedance measuring circuit 16 can be passed between electrodes G5A and G5B, and the magnitude and voltage drop of this current can be measured to determine the impedance in the fluid (9 in FIG. 1) and earth formations (11 in FIG. 1) between electrodes G5A and G5B. If the system designer desires to make the instrument 10 capable of operating in the radial sounding configuration simultaneously with the focused current configuration, it is preferable to make the first impedance measuring circuit operate at a different frequency than do the measuring current source (12 in FIG. 2) and focusing current source (8 in FIG. 2). Since the measurements made in the radial sounding configuration are intended to be much shallower than those made in the focused current configuration, the first impedance measuring circuit 16 can operate at a much higher frequency than do the measuring current source (12 in FIG. 2) and focusing current source (8 in FIG. 2). The first impedance measuring circuit 16 can operate within a range of 1 to at least about 3,000 Hz.

Electrodes G4A and G4B can be interconnected between the input terminals, 18A and 18B, of a second impedance measuring circuit 18. The second impedance measuring circuit 18 can be similar in design to the first impedance measuring circuit 16. Preferably, the first impedance measuring circuit 16 and the second impedance measuring circuit 18 operate at different frequencies from each other so that alternating current from the first circuit 16 will not interfere with the measurements made by the second circuit 18. If the system designer desires that the instrument 10 be capable of simultaneous operation in the focused current and radial sounding modes, the impedance measuring circuits 16, 18 can also operate at frequencies which are different from the ones used for the measuring and focusing current circuits (12, 8 in FIG. 2) for the focused current configuration. The frequency range of the second impedance measuring circuit 18 can be similar to that of the first impedance measuring circuit 16. The output signal of the second impedance measuring circuit 18 can be conducted from terminal 18C to the telemetry unit 26 for transmission of the measurements to the earth's surface for decoding and interpretation.

In a similar manner, electrodes G3A and G3B can be connected between input terminals 20A and 20B of a third impedance measuring circuit 20. Electrodes G2A and G2B can be similarly connected to input terminals 22A, 22B of a fourth impedance measuring circuit 22, and electrodes G1A and G1B can be connected to input terminals 24A, 24B of a fifth impedance measuring circuit 24. The third 20, fourth 22 and fifth 24 impedance measuring circuits also preferably operate at different frequencies from each other and from the first 16 and second 18 impedance measuring circuits (as well as the measuring and focusing circuits for the focused current configuration as previously explained). Measurement signals from the third fourth and fifth impedance measuring circuits 20, 22, 24 respectively, can be conducted through respective signal terminals 20C, 22C, 24C to the telemetry unit 26 for transmission to the earth's surface for decoding and interpretation. The impedance measuring circuits 16, 18, 20 22, 24 can all form part of the signal processing circuits 3. The signal processing circuits 3 can also include all of the circuitry shown in FIG. 2 for the focused resistivity configuration of the instrument 10.

It should be noted that the signal processing circuits 3 need not include five separate impedance measuring circuits each operating at a different frequency. A single impedance measuring circuit may be switched between the respective pairs of electrodes as shown in FIG. 3. It is also to be clearly understood that having five pairs of electrodes for impedance measurement is only shown as an example and is not a limitation on the invention. The instrument 10 can include more or fewer pairs of such electrodes and associated impedance measuring circuits for purposes of this invention. It should be noted that as the number of electrode pairs increases, the instrument can provide increasing ability to resolve the distribution of resistivity of the earth formations radially proximal to the wellbore. The increase in radial resolution ability is offset by the increased complexity of the logging instrument 10 as more pairs of electrodes, and their associated impedance measuring circuits, are added to the instrument. As previously explained in the Background section herein, the vertical resolution of the measurements made by the impedance measuring circuits becomes progressively more coarse as the distance between the electrodes increases. The number of and spacings of the electrodes are therefore limited only for practical reasons.

To improve the vertical resolution of the measurements made in the radial sounding configuration, the input of a voltage measuring circuit 28 may be interconnected between "monitor" electrodes such as M2A, M2B. The voltage measuring circuit 28 can be similar to the ones described in the Fanini et al '727 patent. The voltage measuring circuit 28 should be sensitive to alternating current at the same frequency as the particular impedance measuring circuit (such as 16, 18, 20, 22 and 24 in FIG. 3) for which the particular voltage drop measurement is being made. If five separate impedance measuring circuits are used, each having a different frequency, then the voltage measuring circuit can be substituted by five individual voltage measuring circuits (not shown) each sensitive to a frequency of each one of the impedance measuring circuits. Similarly, if one impedance measuring circuit is used and is switched between selected pairs of electrodes, then only one such voltage measuring circuit 28, sensitive to the same frequency, need be used. The type of voltage measuring circuit used in the instrument 10 is a matter of discretion for the system designer and is not meant to limit the invention. Alternatively, as is shown in the Fanini et al '727 patent, one voltage measuring circuit can be made sensitive to a plurality of different frequencies and the voltage magnitudes measured at each frequency can be conducted to the telemetry unit 26 for transmission to the earth's surface for decoding and interpretation. The voltage measuring circuit 28 is shown connected between electrodes M2A and M2B to provide a vertical resolution of measurement which encompasses approximately the same longitudinal span as the measurements made by the instrument 10 in the focused current configuration. The longitudinal span for the measurements of voltage drop in the radial sounding configuration is provided to simplify processing the measurements from the radial sounding configuration for combination with the measurements made in the focused current configuration. The actual longitudinal span used for the voltage drop measurements is a matter of convenience for the system designer and is not meant to limit the invention. Other longitudinal spans may be used to enable precise measurement of the voltage drop under widely varying measurement conditions, in particular the value of formation resistivity as compared to the value of resistivity of the fluid in the wellbore.

Figure 5:
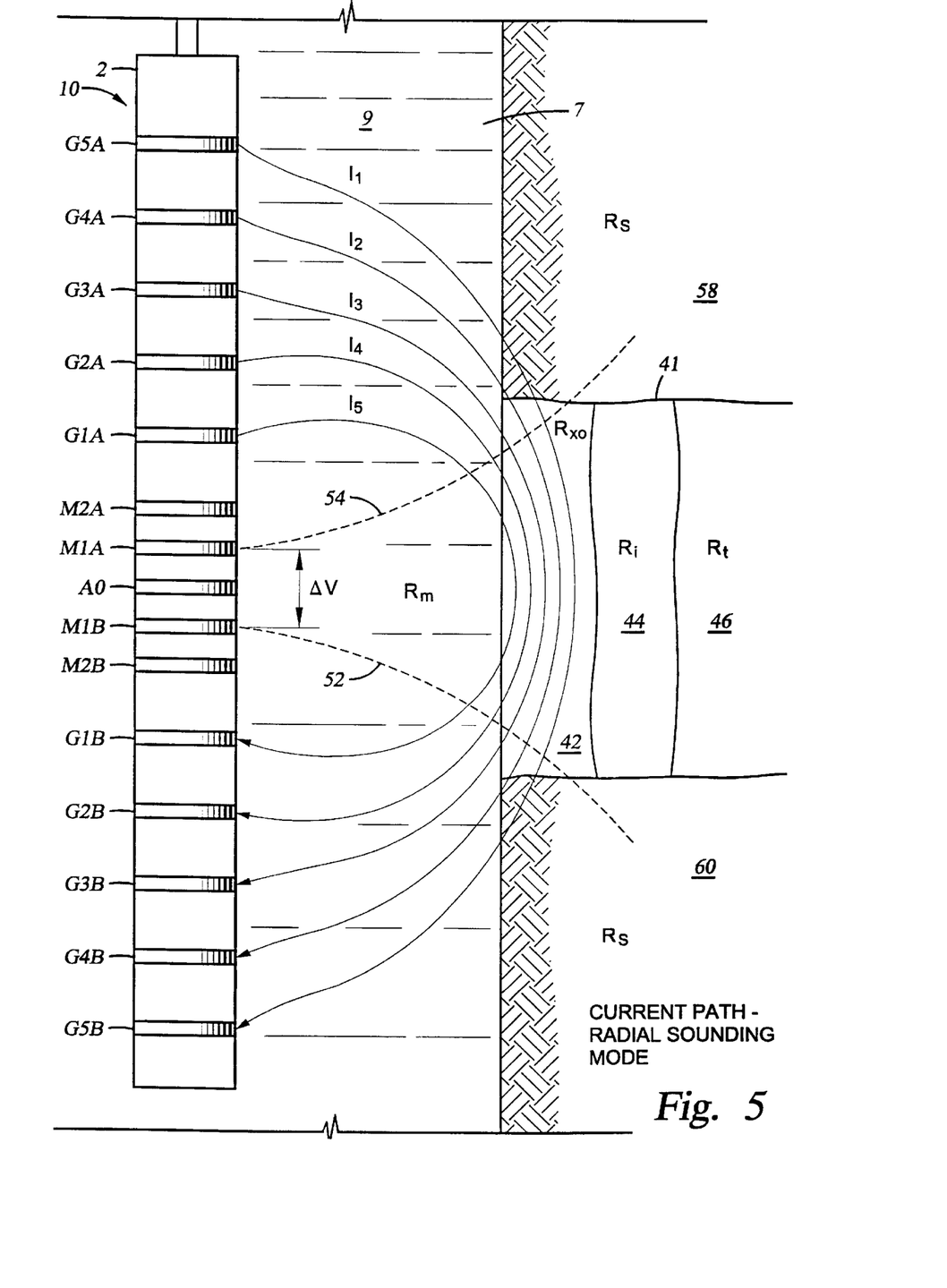
FIG. 5 shows electrical current flow from the instrument in radial sounding mode.

The paths of the measuring current in the radial sounding mode are shown in FIG. 5. The current injected by the first impedance measuring circuit (16 in FIG. 3) is shown flowing between electrodes G5A and G5B as indicated by $I_{m1}$. Generally, current $I_{m1}$ will typically travel the greatest radial distance into the earth formations 11, having at least some of its flow path pass through the invaded zone 44 having resistivity designated by $R_i$. By measuring the voltage drop between the monitor electrodes M2A and M2B, the measurements of impedance made by the first impedance measuring circuit (16 in FIG. 3) can be substantially limited to formation layers positioned approximately between potential lines 52 and 54.

The second through fifth impedance measuring circuits (18, 20, 22, 24 in FIG. 3) will have successively shallower current flow paths designated by $I_{m2}$ through $I_{m5}$, respectively. As the impedance measurement is made through shorter spaced electrode pairs, the radial depth of the current path becomes smaller. As shown in FIG. 5, most of the impedance measurement resulting from current path $I_{m5}$ is related to the resistivity of the fluid 9, designated $R_m$, and the flushed zone 42, having resistivity designated $R_{xo}$. The actual current path taken by $I_{m1}$ through 15 will also depend to some extent on the resistivity of formation layers 58 and 60, designated $R_s$, which are located above and below the layer 41 of interest.

The distribution of resistivities $R_m$, $R_{xo}$ and $R_i$ can be determined from the measurements of impedance by inversion processing procedures known in the art. See for example, U. K. patent no. 2283324 issued on Nov. 26, 1997 and owned by the assignee of this invention, which describes a method for processing signals from an electrode array resistivity well logging instrument. The distribution of resistivities $R_m$, $R_{xo}$ and $R_i$ determined from the radial sounding mode can then be combined with the measurement made in the deep laterolog (focused current) mode to determine $R_t$ (the resistivity of the uninvaded zone).

This description of the invention is meant to serve only as an example of one embodiment of this invention. Those skilled in the art will readily devise other embodiments which do not depart from the spirit of the invention as disclosed herein. Therefore the invention should be limited in scope only by the attached claims.

What is claimed is:

1. An apparatus for determining a distribution of resistivity of earth formations surrounding a wellbore, comprising:

a center electrode conveying a measuring current having a frequency into the formation within a predetermined longitudinal interval;

electrodes disposed at spaced apart locations on either side of the center electrode conveying a focusing current at said frequency into the formation;

circuits connected to said electrodes for measuring a focused current resistivity within a predetermined longitudinal interval; and circuits for measuring electrical impedance between pairs of said electrodes spaced apart at a plurality of different longitudinal spacings.

2. The apparatus as defined in claim 1 further comprising a voltage measuring circuit interconnected between two of said electrodes positioned between said pairs of electrodes connected to said impedance measuring circuits, whereby a longitudinal interval of said impedance measurements can be limited to approximately a longitudinal spacing of said two electrodes connected to said voltage measuring circuit.

3. The apparatus as defined in claim 1 wherein said circuits for measuring said focused current resistivity and said circuits for measuring said impedance each comprise a current source, a current measuring circuit and a voltage measuring circuit operating at an alternating current frequency different from a frequency of the other ones of said current sources, said current measuring circuits and said voltage measuring circuits, so that said impedance measurements and said focused current resistivity can be measured simultaneously.

4. The apparatus as defined in claim 3 wherein said spaced apart electrodes are electrically isolated from each other at substantially any frequency other than said frequency.

5. A method for determining resistivity distribution of earth formations surrounding a wellbore, comprising:

measuring a focused current resistivity of said earth formations within a predetermined longitudinal interval to determine a composite resistivity of an uninvaded zone, an invaded zone and a flushed zone of permeable layers of said earth formation;

measuring impedance between pairs of electrodes, each said pair having a different longitudinal spacing; and determining resistivity of said flushed zone and said invaded zone from said measurements of impedance, whereby said resistivity of said uninvaded zone can be determined by combining said measurement of focused current resistivity with said determined resistivity of said flushed zone and said invaded zone.

6. The method as defined in claim 5 further comprising measuring voltage drop between electrodes having a longitudinal spacing approximately equal to said longitudinal interval of said measurement of focused current resistivity, whereby a vertical resolution of said measuring said impedance is improved.

* * * * *